United States Patent [19]

Gregorian et al.

[11] 4,347,145
[45] * Aug. 31, 1982

[54] FOAM COMPOSITION FOR TREATING TEXTILE MATERIALS AND METHOD OF PREPARATION

[75] Inventors: Razmic S. Gregorian, Aiken; Chettoor G. Namboodri, North Augusta, both of S.C.

[73] Assignee: United Merchants & Manufacturers, Inc., New York, N.Y.

[ * ] Notice: The portion of the term of this patent subsequent to May 12, 1998, has been disclaimed.

[21] Appl. No.: 165,266

[22] Filed: Jul. 2, 1980

Related U.S. Application Data

[63] Continuation of Ser. No. 943,830, Sep. 19, 1978, abandoned, which is a continuation-in-part of Ser. No. 794,627, May 6, 1977, abandoned, and Ser. No. 584,389, Jun. 6, 1975, Pat. No. 4,118,526.

[51] Int. Cl.³ .................... D08M 13/00; B01J 13/00; C09B 67/02; C09K 3/18
[52] U.S. Cl. ........................................ 252/8.6; 8/477; 106/2; 252/8.8; 252/307; 427/373
[58] Field of Search .................. 252/307, 8.6, 8.8; 427/373; 8/477; 106/2

[56] References Cited

U.S. PATENT DOCUMENTS

| | | | |
|---|---|---|---|
| 2,971,458 | 2/1961 | Kumins et al. | 252/307 X |
| 4,099,913 | 7/1978 | Walter et al. | 8/477 |
| 4,118,526 | 10/1978 | Gregorian et al. | 252/307 X |
| 4,266,976 | 5/1981 | Gregorian et al. | 252/307 X |

FOREIGN PATENT DOCUMENTS 485194  5/1938  United Kingdom ............... 252/307

*Primary Examiner*—Richard D. Lovering
*Attorney, Agent, or Firm*—Kenyon & Kenyon

[57] ABSTRACT

A foamable composition suitable for treating fabrics with finishing agents in which a minimum amount of foaming agent is utilized. Up to about 10 percent of foaming system is included in the composition with the ratio of active solids to foaming system being in excess of 8:1. The foam composition may be provided in the form of a paste-like, substantially liquid free admixture of a foaming system and finishing agent.

18 Claims, No Drawings

FOAM COMPOSITION FOR TREATING TEXTILE MATERIALS AND METHOD OF PREPARATION

This application is a continuation of prior application Ser. No. 943,830, filed Sept. 19, 1978, now abandoned, which in turn is a continuation-in-part of application Ser. No. 584,389, filed June 6, 1975, now U.S. Pat. No. 4,118,526 and Ser. No. 794,627, filed May 6, 1977, now abandoned in favor of continuation application Ser. No. 15,030, filed Feb. 26, 1979 and now U.S. Pat. No. 4,266,976.

BACKGROUND OF THE INVENTION

This invention relates to the field of treating textile fabrics with fabric finishing agents, and more particularly, to foamable compositions for applying fabric finishing agents to textile products.

Conventionally, treatment of textile fabrics with finishing agents, e.g., coloring agents or dyes, resins, and the like, has involved a procedure wherein the finishing agent is either dissolved or dispersed in a suitable liquid medium, such as an aqueous or organic liquid, and then the mixture of the finishing agent and liquid medium are applied to the fabric. Thereafter, the carrier is removed from the fabric, usually by evaporation with or without heat. It is further conventional to use small amounts of the finishing agent, relative to the amount of liquid medium in order to conserve the amount of the finishing agent used. This produces relatively large amounts of liquid medium which must be removed from the fabric. Consequently, a substantial amount of the cost incurred in such processes resides in the liquid medium removal step.

Such liquid media present a further problem in that after removal, the liquid must either be disposed of or recovered for re-use. In the case of an aqueous treatment system wherein the liquid media is water, the water is normally disposed of as waste. In recent years, the environmental problems associated with the disposal of the water and residual finishing agents therein have become increasingly prevalent.

With respect to organic solvents as the liquid medium, it is normally desirable to recover them because of their relatively high cost. Recovery systems for this procedure add to the expense of the overall treatment process. Moreover, disposal of the solvent, if it is not recovered, may cause environmental contamination.

The foregoing problems become even more pronounced when treating textile fabrics which are highly absorbent. Thus, for example, when it is desired to treat or finish pile fabrics, e.g., carpeting, sliver knit fabrics, and the like, the fabrics have a tendency to absorb great quantities of the water or organic solvent, thus making the liquid removal step even more difficult and expensive. Additionally, because of the relatively large absorption of the liquid, the weight of the wet fabric which is being handled increases significantly.

In the co-pending application of R. S. Gregorian and C. G. Namboodri, Ser. No. 584,389, filed June 6, 1975 and now U.S. Pat. No. 4,118,526, there is described a novel process for the application of fabric finishing agents to textile fabrics which substantially reduces the large amount of liquid medium utilized in conventional processes. The amount of finishing agent required to produce the desired finishing effect on the fabric, is incorporated in a foamable composition capable of forming a stable foam having a blow ratio in the range of from about 2:1 to about 20:1. The composition is converted to a foam and coated onto the fabric and is thereafter compressed, padded and/or vacuumed to achieve penetration of the foam through the fabric. The so-treated fabric is then dried and, if necessary, cured or fixed in a conventional manner.

Although the process of the above-described application represents a significant advance in the textile treatment arts, further improvement may be achieved, such as in the nature of the particular composition to be used. For instance as was the case with liquid medium systems, the use of excess carrier medium is undesirable. Thus, in a foamable composition, usage of excess foaming agent results in an additional cost factor and may have adverse effects on finish durability. Likewise, further improvement may be achieved in the control of the foaming step and in the desire to reduce the cost of shipping, storage and the like necessarily associated with foamable compositions which typically contain large amounts of water or other liquid medium.

SUMMARY OF THE INVENTION

Briefly stated, the present invention is directed to a foamable composition for treating fabrics with a finishing agent and which is capable of being formed into a foam which is sufficiently stable to substantially retain its characteristics during application. Included in the composition is an amount of fabric finishing agent sufficient to impart the desired finish to the fabric. A foaming system, consisting of a foaming agent and optionally a foam stabilizer and thickener, each or both in combination with the foaming agent, in an amount up to 10 percent is included, the ratio of active solids to that of foaming agent being at least 8:1. Preferably, the ratio is between 10:1 and 2000:1. Further, it is preferred that the amount of foaming agent is less than 2.0 percent. With a minimum amount of foaming agent in the composition, adverse effects of finish durability such as those caused by excessive foaming agent, are avoided. Further, costs are reduced in that excess foaming agent is avoided which not only reduces the composition cost but also eliminates the need to employ additional means to remove the excess foaming agent from the fabric.

According to another aspect of the invention, the composition is provided as a concentrate capable of forming a stable foam upon stirring the concentrate with a liquid medium added thereto. The concentrate composition is an intimate admixture of a foaming agent and a thickening agent.

The substantially liquid-free foam precursor composition enables greatly reduced storage and shipping costs owing to the vastly decreased bulk of the compositions as compared to liquid-containing foamable compositions. Moreover, the substantially liquid-free compositions possess the advantage of precluding any physical or chemical change in the foamable composition which might otherwise result in liquid compositions permitted to stand for any substantial time after preparation and prior to foaming. Still further, the compositions, permit more controlled and varied foaming than liquid-containing compositions in that the ultimate foam blow ratio and density and other properties may be varied correlatively by variation of the amount of liquid medium added to the composition before stirring.

In accordance with this invention, foaming agents which may be utilized include materials selected from the following groups of compounds. In the chemical formulas given, M is a cation of group I of the Periodic System of Elements (e.g., sodium, potassium) or a radical of the formula $NR_4+$ wherein R is selected from the group consisting of hydrogen and lower alkyl; and X is a sulfur or phosphorous derivative of the formula:

$$-\underset{\underset{O}{\|}}{\overset{\overset{O}{\|}}{S}}-O- \quad \text{or} \quad -\underset{\underset{O-}{|}}{\overset{\overset{O}{\|}}{P}}-O-$$

1. Salts of fatty acids represented by the formula:

$$R_1\overset{\overset{O}{\|}}{C}-OM$$

wherein $R_1$ is a hydrocarbon radical of the formula $C_nH_{2n+1}$, $C_nH_{2n-1}$ or $C_nH_{2n-3}$ and n is an integer from 12 to 24. Examples of such materials are ammonium stearate, potassium stearate, ammonium oleate and ammonium ricinoleate.

2. Salts of inorganic esters of aliphatic alcohols represented by the formula:

$$R_2-CH_2\,OXM_m$$

wherein $R_2$ is a hydrocarbon radical $C_nH_{2n+1}$ (wherein n is an integer from 11 to 23) and m is either 1 or 2. Examples of such materials are ammonium lauryl sulfate, sodium tetradecyl sulfate and the sodium salt of the phosphate ester of tridecyl alcohol.

3. Salts of inorganic esters or oxyalkylated aliphatic alcohols of the formula:

$$R_1O\!+\!CH_2\overset{\overset{R}{|}}{C}HO\!\xrightarrow{}_{\!\overline{p}}CH_2\overset{\overset{R}{|}}{C}HO\!-\!X\!-\!M_m$$

wherein p is an integer from 0 to 50 and R, $R_1$, X, M and m are as previously defined. Commercially available examples of such materials are Alfonic ester sulfate (Conoco chemicals) and Alipal CD-128 (GAF Corp.).

4. Salts of organic esters of oxyethylated higher alkyl phenols of the formula:

$$Ar\!\overset{\overset{R_3}{|}}{+}\!OCH_2CH_2\!\xrightarrow{}_{\!\overline{p}}O\!-\!X\!-\!M_m$$

wherein $R_3$ is a higher alkyl of $C_nH_{2n+1}$ (n=8 to 14), Ar is phenyl or napthyl, and X, M, m and p are as previously defined. Such products are commercially available under the tradenames Alipal CO-433 and Alipal CO-436 (GAF Corp.).

5. Salts of substituted sulfosuccinates represented by the formula:

$$MO-\underset{\underset{O}{\|}}{\overset{\overset{O}{\|}}{S}}-\underset{\underset{H_2C-\underset{\underset{O}{\|}}{C}-OR_5}{|}}{\overset{\overset{H}{|}}{C}}-\overset{\overset{O}{\|}}{C}-OR_4$$

wherein $R_4$ is a higher alkyl, an ethoxylated higher alkyl or an ethoxylated alkylphenyl, and $R_5$ is $R_4$ or M. Commercially available examples of these compounds, from American Cyanamid, are aerosol OT, Aerosol A-102 and Aerosol A-103.

6. Salts of N substituted sulfosuccinamates of the formula:

$$M-O-\underset{\underset{O}{\|}}{\overset{\overset{O}{\|}}{S}}-\underset{\underset{H_2C-\underset{\underset{O}{\|}}{C}-OR_4}{|}}{\overset{\overset{H}{|}}{C}}-\overset{\overset{O}{\|}}{C}-N\underset{\diagdown(R_6)}{\diagup^{R_6}}$$

wherein $R_6$ is a higher alkyl. An example of such a material is Aerosol-18 (American Cyanamid).

7. Block and graft copolymers of polyoxyalkyl and polydialkylsiloxy groups of the formula:

$$HO(CH_2CHO)_{\overline{q}}\!\!+\!\!\underset{\underset{R_7}{|}}{\overset{\overset{R_7}{|}}{Si}}-O\!\xrightarrow{}_{\!\overline{r}}\!\!+\!\!\overset{\overset{R_7}{|}}{C}HCH_2O)_sH$$

wherein $R_7$ is a lower alkyl and q, r and s are integers from about 2 to 100, or $$R_7\!-\!\underset{\underset{R_7}{|}}{\overset{\overset{R_7}{|}}{Si}}\!-\!O\!+\!\underset{\underset{R_7}{|}}{\overset{\overset{R_7}{|}}{Si}}\!-\!O)_{\overline{q}}\!\!\left[\!\!+\!\underset{\underset{(CH_2CHO)_tH}{|}}{\overset{\overset{R_7}{|}}{Si}}\!-\!O)\!\!\right]_u\!\!\underset{\underset{R_7}{|}}{\overset{\overset{R_7}{|}}{Si}}\!-\!R_7$$

where t and u are integers from 2 to 100, and $R_7$ and q are as defined above. An exemplary material is Silicone 471-A (Dow Corning).

8. Salts of sulfonated paraffin hydrocarbons of the formula:

$$(C_nH_{2n+1})CH_2\underset{\underset{O}{\|}}{\overset{\overset{O}{\|}}{S}}-OM, \; n = 11 \text{ to } 23,$$

such as Alkanol 189-S (duPont).

9. Salts of sulfonated higher alkyl aromatic hydrocarbons represented by $$Ar\!-\!\!\underset{\underset{O}{\|}}{\overset{\overset{R_6}{\diagup}\overset{O}{\|}}{S}}\!-\!OM$$

wherein Ar and $R_6$ are as earlier defined, for example, the sodium salt of dodecylbenzene sulfonic acid.

10. Oxyalkylated higher alkyl phenols of the formula:

$$R_6\!\!-\!\!\underset{}{\bigodot}\!\!-\!O(CH_2CH_2O)_nH$$

wherein n is an integer from 10 to 100 and $R_6$ is as previously defined. Examples of such compounds are Igepal CO-210 and RC-630 (GAF Corp.).

11. Alkyltrimethylammonium halides of the formula:

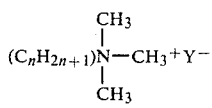

wherein n is an integer from 6 to 24 and Y is a halogen such as Cl or Br. Suitable materials are the trimethyltallow ammonium chlorides (available from Onyx Chemical Co.).

12. Alkyl amine oxides of the formula:

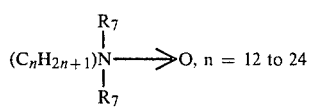

such as Barlox 10 S and Barlox 14 (Lonza Chem. Co.) and Textamine Oxide CA (Textilana Corp.).

13. Alkyl pyridinium halides of the formula:

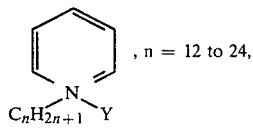

such as Cetyl pyridinium bromide (Aceto Chem. Co.).

14. Alkyl morpholinium halides represented by

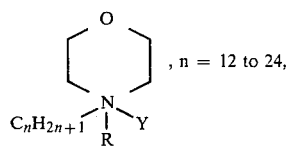

such as Atlas G 271 (ICI).

15. Condensation products of fatty acids with 1 or 2 moles of a primary or secondary alkanolamines. For example, these products are complex mixtures known as Kritchevsky bases. Suitable materials within this group are Valdet CC (Valchem).

16. Condensation products of fatty acids and ethylene amines and substituted ethylene amines of the formula, for example,

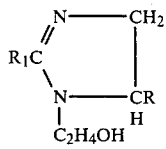

such as Amine 220 (Union Carbide) and Antaron MC-44 (GAF Corp.)

17. Block copolymers of propylene oxide and ethylene oxide represented by:

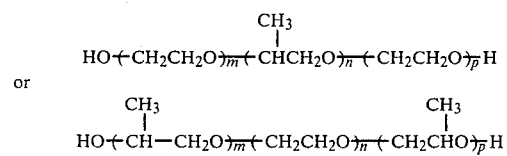

wherein m, n and p are integers from about 10 to 100. Exemplary materials are the family of compounds known as Pluronics from Wyandotte Chem. Co.

18. Fatty acid betaines of the formula:

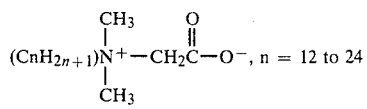

such as Alkateric CAB (Alkard Chemicals).

19. Fluorocarbon surfactants such as the family of Zonyl surfactants (anionic, cationic, nonionic) (duPont) and Fluorad surfactants (3M Co.).

20. Oxyalkylated aliphatic alcohols of the formula

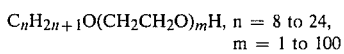

such as Alfonic 1218-60, Emulphogene BC420, Valdet 4016 or Siponic E-3.

Foam stabilizers may also be used in conjunction with the noted foaming agents to obtain added foam stability. Auxiliary foam stabilizers include lauryl alcohol, sodium laurate, lower aliphatic alcohols, dodecyl alcohol, lower aliphatic acids, lauric acid, fatty acids, hydrophilic polymers, such as, agar, polyvinyl alcohol and sodium alginate and blends of these compounds.

Suitable thickeners for admixture with the foaming agent or stabilizer in order to form a paste-like mass therewith include polyarcylic acid, copolymers of acrylic acid, polyvinyl alcohol, natural gums, starches, starch derivatives, cellulose derivatives, synthetic polymeric compounds, water soluble polymers, organic solvent soluble polymers and blends of these compounds. Preferred among these thickeners are cellulosic derivatives such as methylcellulose, hydroxethylcellulose, and the like.

When using the concentrate, the thickener and foaming agent are pre-pasted in ratios which may vary widely according to the desired characteristics of the foam ultimately obtained. In general, suitable mixtures are prepared with about 10-90% by weight thickener to about 90-10% foam stabilizer, preferably in weight ratios of 25:1 to about 3:1 foam stabilizer to thickener.

Additional materials such as emulsifiers, pH adjusting additives such as acids or bases, and the like may be added to the paste-like concentrate. The textile finishing agents themselves, such as dyes, water repellents, antistats, weighting agents, etc. may also be incorporated with the thickener and foaming agent in forming the paste-like foamable precursor concentrate.

One of the advantages of adding the finishing agent during the foaming step is the ability to utilize the thickener/foaming agent precursor composition as a universal carrier system for all such textile finishing agents. Thus, any desired finishing agent may simply be added to the composition along with the addition of liquid medium and then stirred or whipped into a foam for application to textile fabrics.

Typical liquid media which may be added to the concentrate position to form a foam include water, perchloroethylene, methanol, trichloroethylene, and other conventional solvents, e.g., chlorinated hydrocarbons and aliphatic and aromatic hydrocarbon and petroleum solvents.

Generally, the composition of the present invention, after the addition of liquid medium, is capable of being stirred or whipped into a foam having a blow ratio in the range from about 2:1 to 20:1, and preferably, from about 2:1 to 10:1. The blow ratio is determined by measuring the weight of a given volume of a foam compared to the weight of the same volume of the composition prior to foaming. The foam density range is generally from about 0.5 gm/cc to 0.05 gm/cc and preferably, from about 0.5 to 0.1 gm/cc.

Upon the addition of a liquid medium to the paste-like foam concentrate or precursor, the resulting foamable composition typically contains from about 0.01 to 10% by weight of foaming agent, up to 5% and preferably 0.01 to 5% thickener, to which is added from up to about 95% by weight of the appropriate fabric finishing agent.

In order to be suitable for use in treating textile materials, it is important that the foam be sufficiently stable so that it does not collapse between the time when the initial foaming takes place and the time when it is introduced into the fabric. Moreover, the amount of foaming agent present in the composition is important. As indicated, it is preferred that the amount of foam in the composition is less than 2.0 percent and the ratio of active solids to foaming agent be in the range of 15:1 to 2000:1. This insures a uniform application of the finishing agent without any adverse effects as to the durability of the finish.

Accordingly, it is an object of this invention to provide a foamable composition suitable for treating fabrics with a finishing agent, the treated fabric possessing a finish of suitable durability.

It is another object of this invention to provide a foamable composition for treating fabrics with a finishing agent in which the amount of foaming agent with respect to solid materials is suitable for effective treatment of textile fabrics with finishing agent.

It is a further object of this invention to provide a foam composition for treating fabrics with a finishing agent which reduces shipping, storage and associated costs.

It is a still further object of this invention to provide a foam composition for treating fabrics with a finishing agent in the form of concentrate capable of forming a stable foam upon stirring the concentrate with a liquid medium added thereto.

DESCRIPTION OF THE PREFERRED EMBODIMENT

Specific embodiments of the foamable composition of the present invention and the method of its preparation and application are described in more detail with reference to the Examples which follow.

EXAMPLE 1: DURABLE PRESS FINISH

A foamable durable press resin composition was prepared by mixing 35 parts of Valrez 248 (a modified glyoxal resin—38% solids), 2 parts of a textile softener Valsof PE (a polyethylene emulsion—26% solids of which 6.2% is emulsifier), 2 parts of a dye fixative Valfix FST (a formaldehyde dicyandiamide condensate—35% solids), 4 parts Valmel HM (a melamine resin—62% solids) and 9 parts Valcat 7 (a magnesium chloride catalyst—21% solids). This basic finish formulation contained 18.8 parts active solids. To the composition was added a foaming agent in the amount of 0.2 parts 471-A silicone fluid (a silicone polyglycol copolymer) to form a paste like substantially liquid admixture of foam stabilizer and finishing agent. To this was added 47.8 parts of water. The ratio of active solids to total foamer for the composition was 58.2:1.

The concentration of foamer used to calculate the active solids to total foamer ratio in each of the Examples includes the amount of foaming agent added as well as any emulsifiers present in other components of the formulation.

This composition was then foamed using a kitchen mixer to a blow ratio of 5:1. The foam was knife coated on to a 50/50 blend of polyester/cellulose fabric. The fabric was padded at 100 pounds per linear inch and the wet pick-up calculated as approximately 30 percent.

In another sample, Valsof PE was omitted, 0.01 parts of 471-A silicone fluid (silicone polyglycol copolymer) was added to the diluted finishing composition and then foamed using a mechanical foamer (Oakes foamer) to a 20:1 blow ratio. The foam was again knife coated on to a 50/50 blend of polyester/cellulose fabric. For this composition, the ratio of active solids to total foamer was 1840:1.

In each case the fabric was then dried at 240° F. for 2 minutes and cured at 340° F. for 90 seconds. The fabric possessed a good resilient hand with a DP rating (durable press) of 3.8. The resulting fabric's wicking behavior was found to be superior to that of cloth fabrics treated with traditional resin compositions.

EXAMPLE 2: DURABLE PRESS FINISH

A basic finish formulation was prepared by mixing 26.1 parts Valrez 248 (a modified glyoxal resin—38% solids), 6.8 parts Valbond 6021 (an acrylic copolymer—45% solids), 5.1 parts Valcat 7 (a magnesium chloride catalyst—21% solids), 2.0 parts Penford Gum (starch—100% solids) and 3.1% Valsof FNS (pentaerythritol distearate—16% solids). To this paste-like concentrate was added 55.9 parts water. This basic finish formulation contained 16.2 parts active solids.

A hand builder/durable press finish foamable formulation was prepared from 99 parts of the above described basic finish formulation 1 part of Antaron FC-34, a 38% solids fatty acid imidazoline manufactured by the GAF Corporation. The ratio of active solids to total foamer for the composition was 22:1.

The formulation was foamed to a 9 to 1 blow ratio and applied by means of a knife coater to a dyed 50/50 polyester/cotton fabric. A 10 mil coating was applied to the fabric.

The foam coated fabric was passed through a vertical padder in order to compress and collapse the foam.

The fabric wet pick-up was 25%. The fabric was then dried and cured in the conventional manner: drying time 2 minutes at 240° F. and curing time 90 seconds at 340° F.

The resulting fabric possessed a soft but resilient hand. The fabric was stabilized to shrinkage and the dye was fixed.

In conventional finishing, the basic finish formulation would be diluted three fold and the other fabric passed through a bath picking up about 100% of its weight of the bath. Usage of the composition described herein produces a dramatic reduction in water consumption and the energy required to subsequently remove this water.

EXAMPLE 3

To 99 parts of the basic finish formulation of Example 2 was added 1 part of Alipal CO-433, a 28% solids solution of the sodium salt of a sulfated nonylphenoxy-poly (ethyleneoxy) ethanol. The ratio of active solids to total foamer for the composition was 25.5:1.

The formulation was foamed and applied to a polyester/cotton fabric as in Example 2.

The finished fabric had a soft and somewhat drapy hand and was stabilized to shrinkage and the dye fixed as in Example 2.

Similar results were obtained where the Alipal CO-433 was replaced by Valdet CC, a fatty acid diethanolamide available from Valchem. The ratio of active solids to total foamer for the composition using Valdet CC was 11.8:1.

EXAMPLE 4

A foamable composition was prepared from 99 parts of basic finish formulation of Example 2 and 1 part of Valdet CC, a 100% solids fatty acid diethanolamide. The ratio of active solids to total foamer for the composition was 11.8:1.

The finish was foamed to an 8 to 1 blow ratio. A 10 mil coating of the foam was applied by means of a knife coater to the face side of a pigment printed polyester/cotton fabric. The wet pick-up was 30%.

The fabric was passed through a vertical pad to compress and collapse the foam and dried and cured on a frame. The fabric was dried at 240° F. for 5 minutes and cured at 340° F. for 2 minutes.

The finished fabric possessed a shrinkage rating of less than 1% in both fill and warp directions. The fabric had a soft but full hand, and good crocking properties. The sharp print definition was maintained.

EXAMPLE 5

A basic finish formulation was prepared by mixing 35 parts Valrez 248 (a modified glyoxal resin—38% solids), 2 parts Valsof PE (a polyethylene emulsion—26% solids), 2 parts Valfix FST (a formaldehyde condensate—35% solids), 4 parts Valrez HM (a melamine resin—62% solids) and 9 parts Valcat 7 (a magnesium chloride catalyst—21% solids). To this paste-like concentrate was added 47 parts water. This basic finish formulation contained 18.8 parts active solids.

A foamable composition consisting of 99 parts of the basic finish formulation above described and 1 part of Valdet-4016, an 80% solids ethoxylated decyl alcohol manufactured by Valchem, was prepared. The ratio of active solids to total foamer for the composition was 20:1.

The composition was foamed to an 18 to 1 blow ratio and applied by means of a knife coater to a dyed 50/50 polyester/rayon fabric. A 15 mil coating was applied to the fabric. The wet pick-up was 28%.

The fabric was passed through a vertical padder to compress and collapse the foam. The fabric was stretched in the fill direction by 7% and the fabric dried and cured as in Example 2.

The finished fabric possessed a soft and springy hand and the shrinkage in the warp and fill directions after machine laundering was less than 1% indicating effective stabilization of the fabric by the finish. The D.P. rating was 4.

EXAMPLE 6

Foamable compositions were prepared from 99 parts of basic finish formulation of Example 5 and 1 part of the following foaming agents:

Igepal CO-887, a 70% solids solution on a polyethoxylated nonylphenol available from the GAF Corporation. The ratio of active solids to total foamer for the composition was 22.5:1.

Valwet CSP, a phosphated alcohol available from Valchem.

The ratio of active solids to total foamer for the composition was 39.2:1.

Valdet-561, an ethoxylated nonylphenol available from Valchem. The ratio of active solids to total foamer for the composition was 16.5:1.

These formulations were foamed and applied to 50/50 polyester/rayon fabrics in a manner similar to that described in Example 5.

The fabrics were effectively stabilized to shrinkage. The fabrics possessed a soft hand but somewhat less resilience than the fabric in Example 5.

EXAMPLE 7

A basic finish formulation was prepared by mixing 35 parts Valrez 248 (a modified glyoxal resin—38% solids), 2 parts Valsof PE (a polyethylene emulsion—26% solids), 2 parts Sandofix WE (a direct dye fixative manufactured by Sandoz—35% solids), 4 parts Valrez HM (a melamine resin—62% solids) and 9 parts Valcat 7 (a magnesium chloride catalyst-21% solids). To this paste-like composition was added 47 parts water. This basic finish formulation contained 18.8 parts solids.

A foamable composition was prepared from 99 parts of basic finish formulation described above and 1 part of Carsonam 3, a 35% solids coca-betaine. The ratio of active solids to total foamer for the composition was 39.2:1.

The composition was foamed and applied to a pigment printed fabric as in Example 4.

The fabric was stabilized to shrinkage and possessed a desirable soft hand.

EXAMPLE 8

A mixture of 100 parts dioctyl phthalate and 2 parts Fluorad FC-430, a fluorocarbon surfactant available from the 3M Corporation was mechanically foamed to a 2.5:1 blow ratio. The foam composition was applied via a knife coater onto the foam side of a foam backcoated fabric. The coating thickness was 5 mils and the ratio of active solids to total foamer was 50:1.

The coated fabric was passed through a vertical pad to collapse the foam and heated in an oven for 4 minutes at 250° F.

The hand of the fabric was significantly softened by the application of the foamed dioctyl phthalate.

What is claimed is:

1. A foamable composition which is capable of being formed into a foam suitable for treating fabrics with a finishing agent, said foam being sufficiently stable to substantially retain its characteristics during application and not collapse between the time when the initial foaming takes place and the time when the foam is introduced into the fabric, said composition comprising a predetermined amount of fabric finishing agent sufficient to impart the desired finish to the fabric and an effective amount up to about 10 percent of foaming agent sufficient to form said composition into a stable foam having a blow ratio in the range from about 2:1 to 20:1, and a foam density in the range from about 0.5 gm/cc to 0.05 gm/cc, and wherein the ratio of active solids to that of total foamer is at least 8:1.

2. A foamable composition in accordance with claim 1 wherein said foaming agent is part of a foaming system which further includes a foam stabilizer and/or thickener therein.

3. A foamable composition in accordance with claim 2 wherein the ratio of active solids to said foaming system is between 10:1 and 2000:1.

4. A foamable composition in accordance with claim 2 wherein the percent of said foaming system is less than 2.0 percent.

5. A foamable composition in accordance with claim 1 wherein said foaming agent is selected from the group consisting of salts of fatty acids, oxyalkylated higher alkyl phenols and oxyalkylated aliphatic alcohols.

6. A foamable composition in accordance with claim 1 wherein said foaming agent is selected from the group consisting of block and graft copolymers of polyoxyalkyl and polydialkylsiloxy groups.

7. A foamable composition in accordance with claim 1 wherein said foaming agent is a fluorocarbon surfactant.

8. A foamable composition in accordance with claim 2 wherein said thickener comprises a cellulosic derivative.

9. A foamable composition in accordance with claim 1 wherein said composition comprises a substantially liquid free admixture capable of foaming upon the addition of a liquid medium.

10. A concentrate composition for forming a stable foam suitble for foam dyeing, finishing or printing, said foam being sufficiently stable so as not to collapse between the time when the initial foaming of the concentrate composition takes place and the time when the foam is introduced into the fabric, said concentrate composition comprising a substantially liquid-free admixture of a foam system and the desired treating agent, said foaming system consisting of a foaming agent, a foam stabilizer and/or thickener in an effective amount up to about 10 percent sufficient to form said composition into a stable foam having a blow ratio in the range from about 2:1 to 20:1, and a foam density in the range from about 0.5 gm/cc to 0.05 gm/cc, the ratio of active solids to that of said foaming system being at least 8:1.

11. A concentrate composition in accordance with claim 10 wherein the ratio of active solids to said foaming system is between 10:1 and 2000:1.

12. A concentrate composition in accordance with claim 10 wherein the percent of said foaming system after addition of a liquid medium is less than 2.0 percent.

13. A concentrate composition in accordance with claim 10 wherein said foaming agent is selected from the group consisting of amine oxides and alkali betaines.

14. A concentrate composition in accordance with claim 10 wherein said foaming agent is selected from the group consisting of salts of fatty acids, oxyalkylated higher alkyl phenols and oxyalkylated aliphatic alcohols.

15. A concentrate composition in accordance with claim 10 wherein said foaming agent is selected from the group consisting of block and graft copolymers of polyoxyalkyl and polydialkylsiloxy groups.

16. A concentrate composition in accordance with claim 10 wherein said foaming agent is a fluorocarbon surfactant.

17. A method of forming a concentrate composition suitable for foam dyeing, finishing or printing textile materials which comprises the step of mixing a foaming agent and the desired treating agent into a substantially liquid-free admixture which upon the addition of a liquid medium and foaming forms a stable foam suitable for dyeing, finishing or printing textile materials, said foam being sufficiently stable so as not to collapse between the time when the initial foam is formed from said concentrate and the time when the foam is introduced into the fabric, said mixture including an effective amount up to about 10 percent of a foaming system sufficient to form said composition into a stable foam having a blow ratio in the range from about 2:1 to 20:1, and a foam density in the range from about 0.5 gm/cc to 0.05 gm/cc, and having a ratio of active solids to that of said foaming system of at least 8:1, said foaming agent being a part of said foaming system which further includes a foam stabilizer and/or thickener therein.

18. The method of claim 17 wherein the percent of said foaming system is less than 2.0 percent of the mixture.

* * * * *